United States Patent
Tatara et al.

(10) Patent No.: US 7,296,648 B2
(45) Date of Patent: Nov. 20, 2007

(54) POWER CONTROL APPARATUS FOR HYBRID VEHICLE

(75) Inventors: Yusuke Tatara, Tokyo (JP); Osamu Saito, Shioya-gun (JP); Shuji Oshida, Shioya-gun (JP); Tetsuya Hasebe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 10/528,693

(22) PCT Filed: Sep. 29, 2003

(86) PCT No.: PCT/JP03/12416

§ 371 (c)(1), (2), (4) Date: Mar. 22, 2005

(87) PCT Pub. No.: WO2004/030970

PCT Pub. Date: Apr. 15, 2004

(65) Prior Publication Data

US 2005/0284671 A1    Dec. 29, 2005

(30) Foreign Application Priority Data

Oct. 2, 2002    (JP)    ............................ 2002-289691

(51) Int. Cl.
B62D 61/10    (2006.01)

(52) U.S. Cl. ............... 180/242; 180/65.2; 180/65.4

(58) Field of Classification Search ............... 180/233, 180/242, 65.1, 65.2, 65.3, 65.4
See application file for complete search history.

(56) References Cited

U.S. PATENT DOCUMENTS 4,923,025 A * 5/1990 Ellers .................. 180/65.2
5,495,906 A * 3/1996 Furutani .................. 180/65.2
5,788,005 A * 8/1998 Arai ........................ 180/65.2
5,984,034 A   11/1999 Morisawa et al.
6,205,379 B1 * 3/2001 Morisawa et al. ............ 701/22
6,575,870 B2 * 6/2003 Kitano et al. .................. 477/3
6,902,511 B2 * 6/2005 Shimizu et al. ................ 477/4
6,962,550 B2 * 11/2005 Kadota ........................ 477/15
7,140,459 B2 * 11/2006 Shimizu .................... 180/65.2
2002/0013194 A1   1/2002 Kitano et al.

FOREIGN PATENT DOCUMENTS

EP    0 775 607 A1    5/1997

(Continued)

Primary Examiner—Christopher P. Ellis
Assistant Examiner—Brian Swenson
(74) Attorney, Agent, or Firm—Arent Fox LLP (57) ABSTRACT

A power control apparatus for a hybrid vehicle (1), the hybrid vehicle including an internal combustion engine (11), a front motor-generator (12), and a transmission (13) which are connected to front wheels (Wf), and a rear motor-generator (14) which is connected to rear wheels (Wr) via a rear differential gear box (DR). A calculated value, which is obtained by subtracting a front output power F_POWER and an accessory output power DV_POWER from a battery output power limit B_LimPow is set as an rear output power limit R_LimPow. The smaller of a rear drive command R_PowCmd (which is set depending on the running state of the vehicle) and a rear output power limit R_LimPow is set as a new rear drive command R_PowCmd. Accordingly, a demanded motor output power can be obtained without increasing the size of the main battery (15).

7 Claims, 6 Drawing Sheets

FOREIGN PATENT DOCUMENTS

| | | |
|---|---|---|
| EP | 1 241 042 A2 | 9/2002 |
| JP | 10-283039 | 10/1998 |
| JP | 11-318001 | 11/1999 |
| JP | 2000-175305 | 6/2000 |
| JP | 2001-177909 | 6/2001 |

* cited by examiner

POWER CONTROL APPARATUS FOR HYBRID VEHICLE

BACKGROUND OF THE INVENTION

1. Field of the Invention

The present invention relates to a power control apparatus for a four-wheel drive hybrid vehicle having an internal combustion engine and a motor as power sources.

2. Description of the Related Art

Conventionally, a power control apparatus for a hybrid vehicle is known in the art, which, for example, includes an internal combustion engine as a power source for driving front wheels, an AC generator that is driven by the internal combustion engine, an electrical energy storage device for storing electrical energy generated by the AC generator, and a motor that drives rear wheels by being supplied with electrical energy from the electrical energy storage device, and in which the amount of generation by the AC generator is controlled depending on the difference between the rotational speeds of the front wheels and the rear wheels (see, for example, Japanese Unexamined Patent Application, First Publication No. Hei 11-318001).

Moreover, conventionally, a hybrid vehicle is known in the art, which, for example, includes an internal combustion engine for driving either the front wheels or the rear wheels, a generator that is driven by the internal combustion engine, and a motor that drives the other of the front and rear wheels by being supplied with electrical energy from the generator, and in which a target torque of the motor is determined depending on the difference between the rotational speeds of the front wheels and the rear wheels, or depending on a depression amount of the accelerator pedal (see, for example, Japanese Unexamined Patent Application, First Publication No. 2001-177909).

In the above-mentioned power control apparatus for a hybrid vehicle, because the motor for the rear wheels is driven by merely being supplied with electrical energy from the electrical energy storage device, the capacity of the electrical energy storage device must be increased, or the output voltage of the electrical energy storage device must be made higher in order to increase the output power of the motor. In such a case, problems are encountered in that the electrical energy storage device becomes large, and high tension elements become large.

Moreover, in the above-mentioned hybrid vehicle, because the motor for driving either the front wheels or the rear wheels is driven by merely being supplied with electrical energy from the generator, the output power of the motor is limited by the maximum electrical power of the generator; therefore, a desired output power may not be obtained.

SUMMARY OF THE INVENTION

The present invention was conceived in view of the above circumstances, and an object of the present invention is to provide a power control apparatus for a hybrid vehicle, which includes an internal combustion engine for driving either the front wheels or the rear wheels, a motor that drives the other of the front and rear wheels, and an electrical energy storage device that receives energy from and sends energy to the motor, and which enables obtaining a desired output power of the motor without increasing the size of the electrical energy storage device.

In order to achieve the above object, the present invention provides a power control apparatus for a hybrid vehicle including: an internal combustion engine for driving either the front wheels or the rear wheels; a first motor-generator which is connected to an output shaft of the internal combustion engine; a second motor-generator which is connected to the other of the front and rear wheels; an electrical energy storage device which receives energy from and sends energy to the first and second motor-generators; and a control unit which is operatively connected to the internal combustion engine, the first and second motor-generator, and the electrical energy storage device, and which includes: an electrical discharge amount calculation section for calculating the electrical power dischargeable from the electrical energy storage device; an electrical power calculation section for calculating the electrical power being generated by the first motor-generator or for calculating the electrical power being supplied to the first motor-generator; an output power command calculation section for calculating an output power command for a powering operation of the second motor-generator; and an output power limiting section which is adapted to calculate the sum of the electrical power dischargeable from the electrical energy storage device and the electrical power being generated by the first motor-generator or the difference between the electrical power dischargeable from the electrical energy storage device and the electrical power being supplied to the first motor-generator, to compare magnitudes of the sum or the difference and of the output power command for the second motor-generator, and to set the smaller of the sum or the difference and the output power command for the second motor-generator as a new output power command for the second motor-generator.

According to the power control apparatus for a hybrid vehicle configured as described above, the second motor-generator can be operated using the electrical power being generated by the first motor-generator in addition to the electrical power dischargeable from the electrical energy storage device. As a result, the front wheels or the rear wheels can be driven by the second motor-generator with an output power which is greater than the electrical power dischargeable from the electrical energy storage device by the electrical power being generated by the first motor-generator. In other words, the output power of the second motor-generator can be greater, without increasing the size of the electrical energy storage device, than in the case in which the second motor-generator is operated merely using the electrical power dischargeable from the electrical energy storage device or the electrical power being generated by the first motor-generator.

Moreover, the electrical power which can be supplied from the electrical energy storage device and the first motor-generator to the second motor-generator, i.e., the sum of the electrical power dischargeable from the electrical energy storage device and the electrical power being generated by the first motor-generator or the difference between the electrical power dischargeable from the electrical energy storage device and the electrical power being supplied to the first motor-generator, is calculated, and when the sum or the difference is smaller than the output power command for the second motor-generator, the output power command for the second motor-generator is limited by the output power limiting section. As a result, the second motor-generator can be operated in a powering manner while the electrical energy storage device and the first motor-generator are preferably operated in such a manner that, for example, the electrical energy storage device is prevented from being over-discharged, and the first motor-generator is prevented from receiving an excessive electrical generation command.

The power control apparatus for a hybrid vehicle may further include a second electrical energy storage device which is different from the electrical energy storage device, and which is operatively connected to the control unit. The control unit may further include a second electrical discharge amount calculation section for calculating the electrical power being discharged from the second electrical energy storage device, and the electrical discharge amount calculation section may be adapted to set a calculated value, which is obtained by subtracting the electrical power being discharged from the second electrical energy storage device from the electrical power dischargeable from the electrical energy storage device, as a new electrical power dischargeable from the electrical energy storage device.

According to the power control apparatus for a hybrid vehicle configured as described above, at least the electrical power being discharged from the second electrical energy storage device can be supplemented by the electrical energy storage device, and at the same time, the output power of the second motor-generator can be increased while the electrical energy storage device and the first motor-generator are preferably operated.

The power control apparatus for a hybrid vehicle may further include a second electrical energy storage device which is different from the electrical energy storage device, and which is operatively connected to the control unit. The control unit may further include a second electrical discharge amount calculation section for calculating the electrical power being discharged from the second electrical energy storage device, and a generation command calculation section which is adapted to obtain a calculated value by subtracting the output power command for the second motor-generator and the electrical power being discharged from the second electrical energy storage device from the electrical power dischargeable from the electrical energy storage device, and to set the absolute value of the calculated value as a generation command for a generating operation of the first motor-generator when the calculated value is negative.

According to the power control apparatus for a hybrid vehicle configured as described above, when the sum of the output power command for the second motor-generator and the electrical power being discharged from the second electrical energy storage device is greater than the electrical power dischargeable from the electrical energy storage device, the electrical power being generated by the first motor-generator may be increased so that the output power of the second motor-generator and the electrical power being discharged from the second electrical energy storage device can be provided by the electrical power dischargeable from the electrical energy storage device and the electrical power being generated by the first motor-generator.

The power control apparatus for a hybrid vehicle may further include a deterioration detecting device for determining whether the electrical energy storage device has deteriorated, and the control unit may further include an output power command setting section for setting the output power command for the second motor-generator in such a manner that, when the electrical power calculation section is calculating the electrical power being generated by the first motor-generator, and when deterioration of the electrical energy storage device is detected by the deterioration detecting device, the electrical power being generated by the first motor-generator which is calculated by the electrical power calculation section is set as the output power command for the second motor-generator.

According to the power control apparatus for a hybrid vehicle configured as described above, when deterioration of the electrical energy storage device is detected, the output power command for the second motor-generator can be ensured by the electrical power being generated by the first motor-generator.

The power control apparatus for a hybrid vehicle may further include a second electrical energy storage device which is different from the electrical energy storage device, and which is operatively connected to the control unit. The control unit may further include a second electrical discharge amount calculation section for calculating the electrical power being discharged from the second electrical energy storage device, and the output power command setting section may be adapted to set a calculated value, which is obtained by subtracting the electrical power being discharged from the second electrical energy storage device from the electrical power being generated by the first motor-generator which is calculated by the electrical power calculation section, as the output power command for the second motor-generator.

According to the power control apparatus for a hybrid vehicle configured as described above, when deterioration of the electrical energy storage device is detected, the electrical power being discharged from the second electrical energy storage device in addition to the output power command for the second motor-generator can be ensured by the electrical power being generated by the first motor-generator.

The present invention further provides a power control apparatus for a hybrid vehicle including: an internal combustion engine for driving either the front wheels or the rear wheels; a first motor-generator which is connected to an output shaft of the internal combustion engine; a second motor-generator which is connected to the other of the front and rear wheels; an electrical energy storage device which receives energy from and sends energy to the first and second motor-generators; and a control unit which is operatively connected to the internal combustion engine, the first and second motor-generator, and the electrical energy storage device, and which includes: an electrical charge amount calculation section for calculating the electrical power chargeable into the electrical energy storage device; an electrical power calculation section for calculating the electrical power being generated by the first motor-generator or for calculating the electrical power being supplied to the first motor-generator; a regeneration command calculation section for calculating a regeneration command for a regenerating operation of the second motor-generator; and a regeneration limiting section which is adapted to calculate the sum of the electrical power chargeable into the electrical energy storage device and the electrical power being supplied to the first motor-generator or the difference between the electrical power chargeable into the electrical energy storage device and the electrical power being generated by the first motor-generator, to compare magnitudes of the sum or the difference and of the regeneration command for the second motor-generator, and to set the smaller of the sum or the difference and the regeneration command for the second motor-generator as a new regeneration command for the second motor-generator.

According to the power control apparatus for a hybrid vehicle configured as described above, the electrical energy storage device can be charged using the regenerated energy from the second motor-generator in addition to the electrical power being generated by the first motor-generator. As a result, an amount of electrical energy, by which the electrical power chargeable into the electrical energy exceeds the electrical power being generated by the first motor-generator, can be provided by the regenerating operation of the second motor-generator. In other words, the regenerated energy from the second motor-generator can be greater, without increasing the size of the electrical energy storage device, than in the case in which the second motor-generator is operated in a regeneration manner merely depending on the electrical power chargeable into the electrical energy storage device or depending on the electrical power being supplied to the first motor-generator.

When the electrical power which can be supplied from the second motor-generator to the electrical energy storage device and the first motor-generator, i.e., the sum of the electrical power chargeable into the electrical energy storage device and the electrical power being supplied to the first motor-generator or the difference between the electrical power chargeable into the electrical energy storage device and the electrical power being generated by the first motor-generator is smaller than the regeneration command applied to the second motor-generator, the regeneration command for the second motor-generator is limited by the regeneration limiting section. As a result, the second motor-generator can be operated in a regenerating manner while the electrical energy storage device and the first motor-generator are preferably operated in such a manner that, for example, the electrical energy storage device is prevented from being over-charged, and the first motor-generator is prevented from being supplied with an excessive electrical power.

The power control apparatus for a hybrid vehicle may further include a second electrical energy storage device which is different from the electrical energy storage device, and which is operatively connected to the control unit. The control unit may further include a second electrical discharge amount calculation section for calculating the electrical power being discharged from the second electrical energy storage device, and the electrical charge amount calculation section may be adapted to set a calculated value, which is obtained by adding the electrical power being discharged from the second electrical energy storage device to the electrical power chargeable into the electrical energy storage device, as a new electrical power dischargeable from the electrical energy storage device.

According to the power control apparatus for a hybrid vehicle configured as described above, the electrical power being discharged from the second electrical energy storage device can be provided by the regenerated energy from the second motor-generator; therefore, the regenerated energy from the second motor-generator can be increased while the electrical energy storage device and the first motor-generator are preferably operated.

DETAILED DESCRIPTION OF THE PREFERRED EMBODIMENTS

Figure 1:
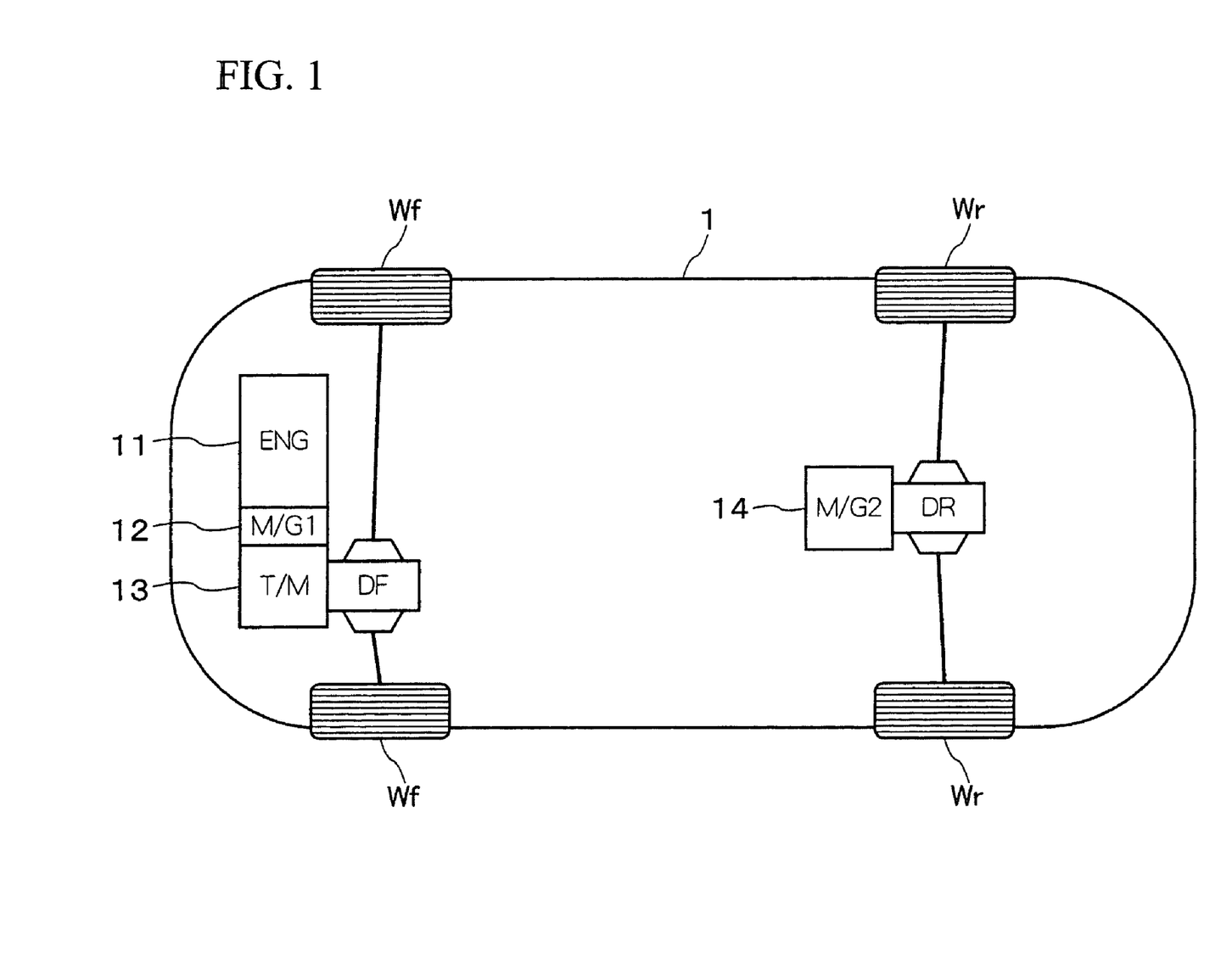
FIG. 1 is a diagram showing the general structure of a hybrid vehicle having a power control device for a hybrid vehicle according to an embodiment of the present invention.
Figure 2:
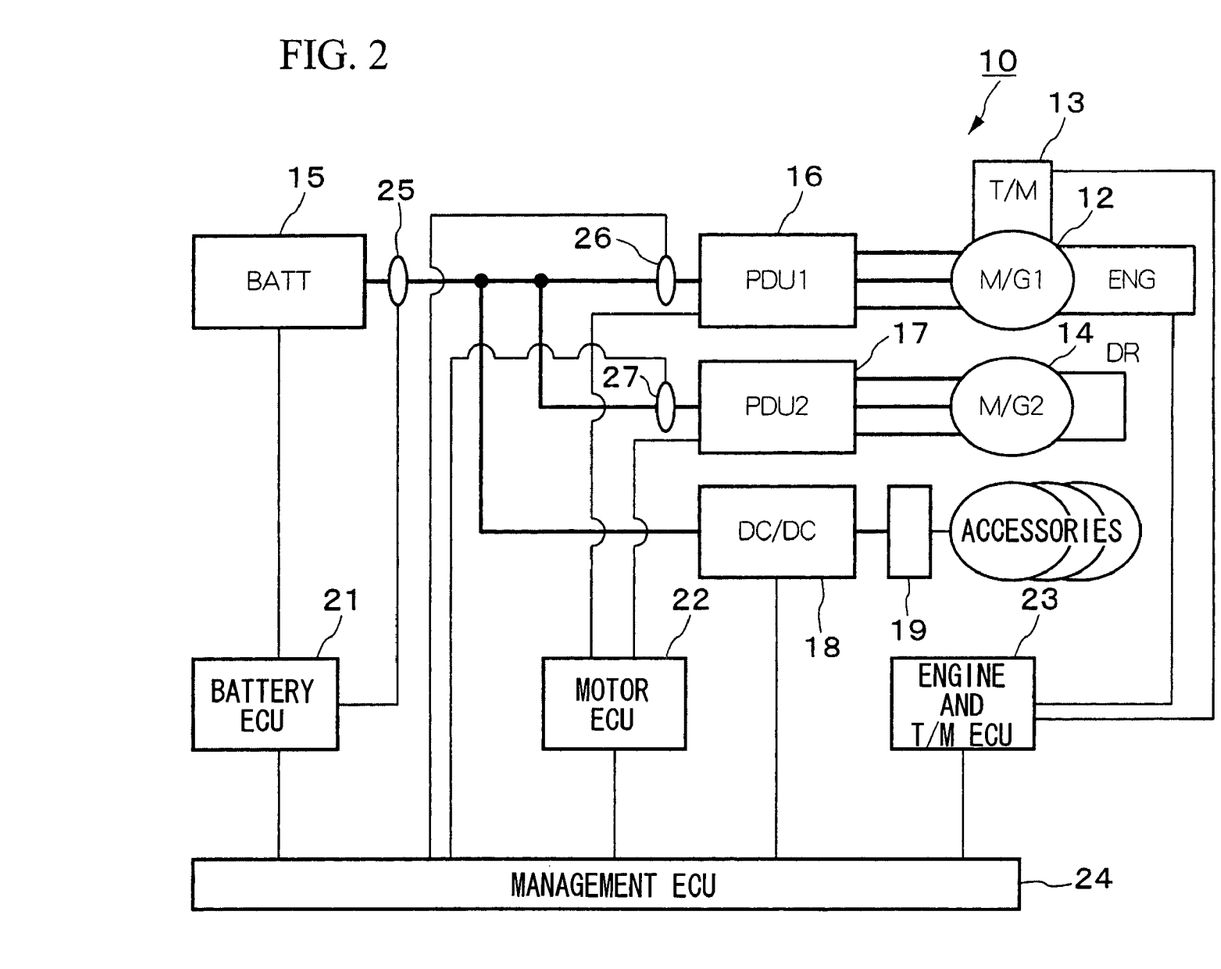
FIG. 2 is a diagram showing the general structure of the power control device for a hybrid vehicle according to the above embodiment of the present invention.

An embodiment of the power control device for a hybrid vehicle according to the present invention will be explained below with reference to the appended drawings. As shown in FIGS. 1 and 2, the power control device 10 for a hybrid vehicle according to this embodiment is installed in a four-wheel drive hybrid vehicle 1 in which, for example, an internal combustion engine (indicated by ENG in the drawings) 11, a front motor-generator (M/G1) 12, and a transmission (T/M) 13, which are directly connected to each other in series, are connected to front wheels Wf via a front differential gear box DF, and a rear motor-generator (M/G2) 14 is connected to rear wheels Wr via a rear differential gear box DR. The power control device 10 includes a main battery (BATT) 15, a front power drive unit (PDU1) 16, a rear power drive unit (PDU2) 17, a DC-DC converter (DC-DC) 18, an auxiliary battery 19, a battery ECU 21, a motor ECU 22, an engine and T/M ECU 23, and a management ECU 24.

In the hybrid vehicle 1, the driving powers of the internal combustion engine 11 and the front motor-generator 12 are transmitted to the front wheels Wf via the transmission 13 such as an automatic transmission (A/T), a CVT, a manual transmission (M/T), or the like, and via the front differential gear box DF which distributes the driving power between the right and left front wheels Wf.

The driving power of the rear motor-generator 14 is transmitted to the rear wheels Wr via the rear differential gear box DR which has a clutch (not shown), and which distributes the driving power between the right and left rear wheels Wr.

When the clutch (not shown) provided in the rear differential gear box DR is disengaged, the vehicle is placed in a front-wheel drive state in which solely the front wheels Wf are driven, and when the clutch is engaged, the vehicle is placed in a four-wheel drive state in which both the front and rear wheels Wf and Wr are driven. In the four-wheel drive state, distribution of the driving power between the right and left rear wheels Wr can be freely controlled.

Moreover, when power is transmitted in reverse from the front wheels Wf to the front motor-generator 12, and from the rear wheels Wr to the rear motor-generator 14, such as when the hybrid vehicle 1 decelerates, the motor-generators 12 and 14 act as generators so as to generate so-called regenerative braking force, whereby the kinetic energy of the vehicle is recovered as electrical energy.

The powering operation and regenerating operation (generating operation) of the motor-generators 12 and 14 are controlled by the power drive units 16 and 17 while receiving control commands from the motor ECU 22.

To the power drive units 16 and 17, each of which includes a PWM inverter that operates in a pulse width modulation mode, the high voltage main battery 15, which receives energy from and sends energy to the motor-generators 12 and 14, is connected. The main battery 15 includes a plurality of modules which are connected to each other in series, and each of which, as a unit, includes a plurality of cells which are connected to each other in series.

Furthermore, the 12-volt auxiliary battery 19, which is provided for operating various electrical accessories, is connected to the main battery 15 via the DC-DC converter 18.

The DC-DC converter 18, which is controlled by the management ECU 24, steps down voltage between terminals of the main battery 15, or steps down voltage generated by the motor-generators 12 and 14 while being controlled by the power drive units 16 and 17 in order to charge the auxiliary battery 19.

The power drive units 16 and 17, and the DC-DC converter 18 are connected to the main battery 15 in parallel to each other.

The battery ECU 21 protects the main battery 15, calculates a state of charge SOC of the battery, and calculates the electrical power dischargeable from the main battery 15 and the electrical power charged into the main battery 15. Moreover, the battery ECU 21 determines whether or not the main battery 15 deteriorates depending on the state of charge SOC, a measured voltage between the terminals of the main battery 15, the temperature of the main battery 15, past changes in discharged current and charged current, etc. To this end, the battery ECU 21 is provided with signals from a current sensor 25 for measuring current flowing into and from the main battery 15, and signals from a voltage sensor (not shown) for measuring voltage between the terminals of the main battery 15.

The motor ECU 22 controls the powering operation and regenerating operation of the motor-generators 12 and 14 in accordance with a powering torque command and a regenerating torque command which are input from the management ECU 24.

The engine and T/M ECU 23 controls the operation of a fuel injection valve (not shown) for regulating an amount of fuel supply to the internal combustion engine 11, the operation of a starter motor (not shown), ignition timing, and the gear change operation of the transmission 13.

The management ECU 24 controls the operations of the battery ECU 21, of the motor ECU 22, of the engine and T/M ECU 23, and of the DC-DC converter 18.

As will be explained later, the management ECU 24 calculates a rear output power limit R_LimPow, which is an output power limit applied to the powering operation of the rear motor-generator 14, and sets an output power command (i.e., a rear drive command R_PowCmd) for the powering operation of the rear motor-generator 14 based on, for example, a battery output power limit B_LimPow, which is the electrical power dischargeable from the main battery 15, a front output power F_POWER, which is an output power from the front motor-generator 12, and an accessory output power DV_POWER, and the management ECU 24.

To this end, the management ECU 24 is provided with signals from current sensors 26 and 27 for respectively measuring current flowing into and from the power drive units 16 and 17.

The power control apparatus 10 according to the present embodiment is configured as explained above. Next, the operation of the power control apparatus 10 will be explained.

Figure 3:
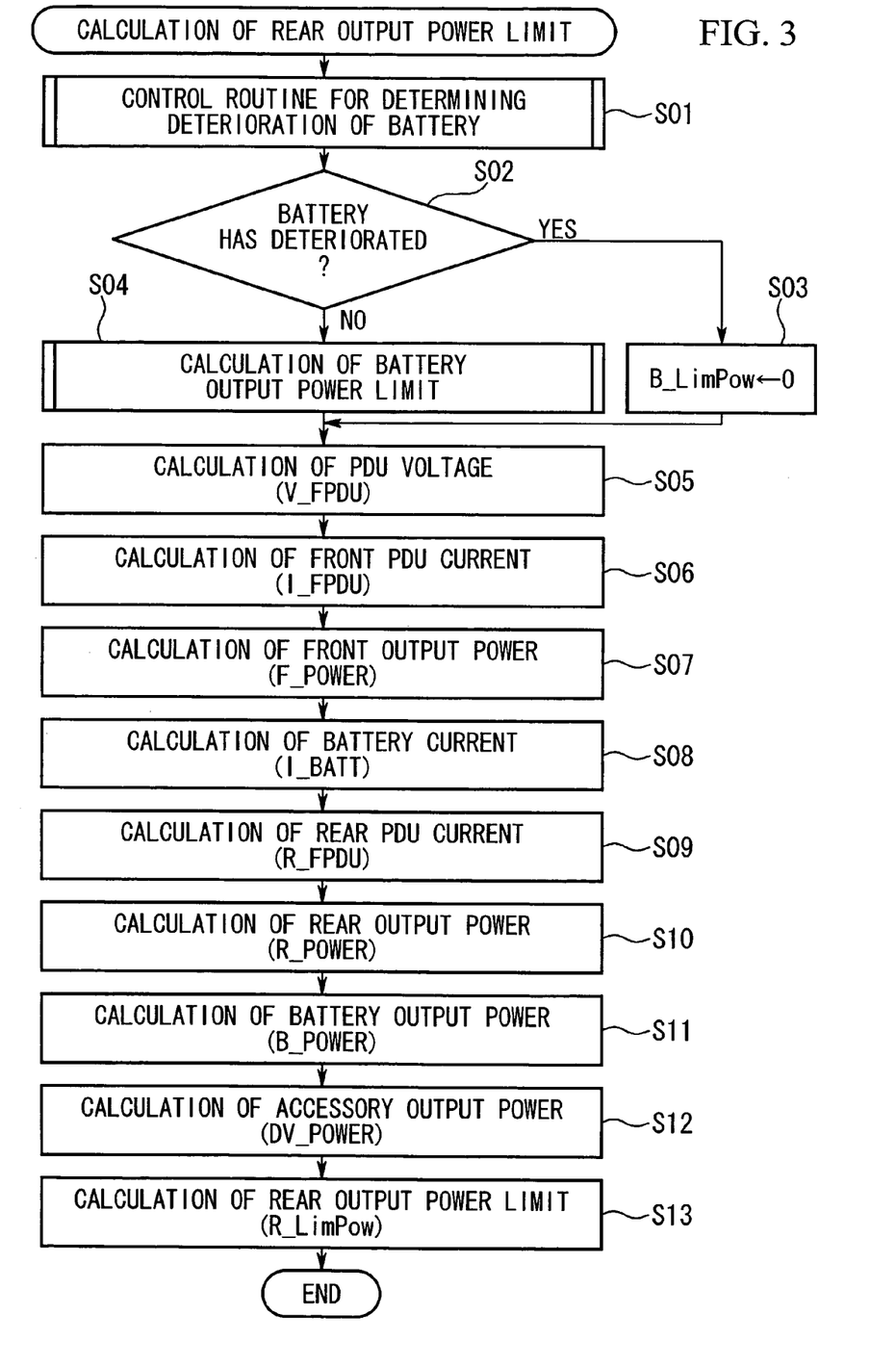
FIG. 3 is a flowchart showing a control operation for calculating an output power limit that is applied to a powering operation of a rear motor-generator.

The operation for calculating the output power limit applied to the powering operation of the rear motor-generator 14 will be explained below.

In step S01 shown in FIG. 3, criteria with regard to the state of charge SOC, a measured voltage between the terminals of the main battery 15, the temperature of the main battery 15, and past changes in discharged current and charged current, which are used for determining whether the main battery 15 has deteriorated, are calculated.

In step S02, it is determined whether the main battery 15 has deteriorated based on the calculated criteria.

When the result of the determination is "YES", the control operation proceeds to step S03, in which the battery output power limit B_LimPow, which is the electrical power dischargeable from the main battery 15, is set to be zero, and the operation proceeds to step S05, which will be explained later.

In contrast, when the result of the determination is "NO", the control operation proceeds to step S04.

In step S04, the operation for calculating the battery output power limit is executed.

In step S05, PDU voltage V_FPDU, which is voltage between terminals of the main battery 15, is calculated based on, for example, signals from voltage sensor (not shown).

Next, in step S06, PDU current I_FPDU, which is input current supplied to the front power drive unit 16, is calculated based on, for example, signals from the current sensor 26.

In step S07, a calculated value, which is obtained by multiplying the PDU voltage V_FPDU by the PDU current I_FPDU, i.e., the momentary electrical power being supplied to the front motor-generator 12, is set as the front output power F_POWER to be output by the front motor-generator 12.

Next, in step S08, battery current I_BATT, which is output current output from the main battery 15, is calculated based on, for example, signals from the current sensor 25.

In step S09, PDU current I_RPDU, which is input current supplied to the rear power drive unit 16, is calculated based on, for example, signals from the current sensor 27.

In step S10, a calculated value, which is obtained by multiplying the PDU voltage V_FPDU by the PDU current I_RPDU, i.e., the momentary electrical power being supplied to the rear motor-generator 14, is set as the rear output power R_POWER to be output by the rear motor-generator 14.

In step S11, a calculated value, which is obtained by multiplying the PDU voltage V_FPDU by the battery current I_BATT, i.e., the momentary electrical power being discharged from the main battery 15, is set as a battery output power B_POWER.

In step S12, a calculated value, which is obtained by subtracting the front output power F_POWER from the battery output power B_POWER, i.e., the momentary electrical power being discharged from the DC-DC converter 18 is set as the accessory output power DV_POWER.

In step S13, a calculated value, which is obtained by subtracting the front output power F_POWER and the accessory output power DV_POWER from the battery output power limit B_LimPow is set as the rear output power limit R_LimPow, which is an output power limit applied to the powering operation of the rear motor-generator 14, and the series of operations is terminated.

Figure 4:
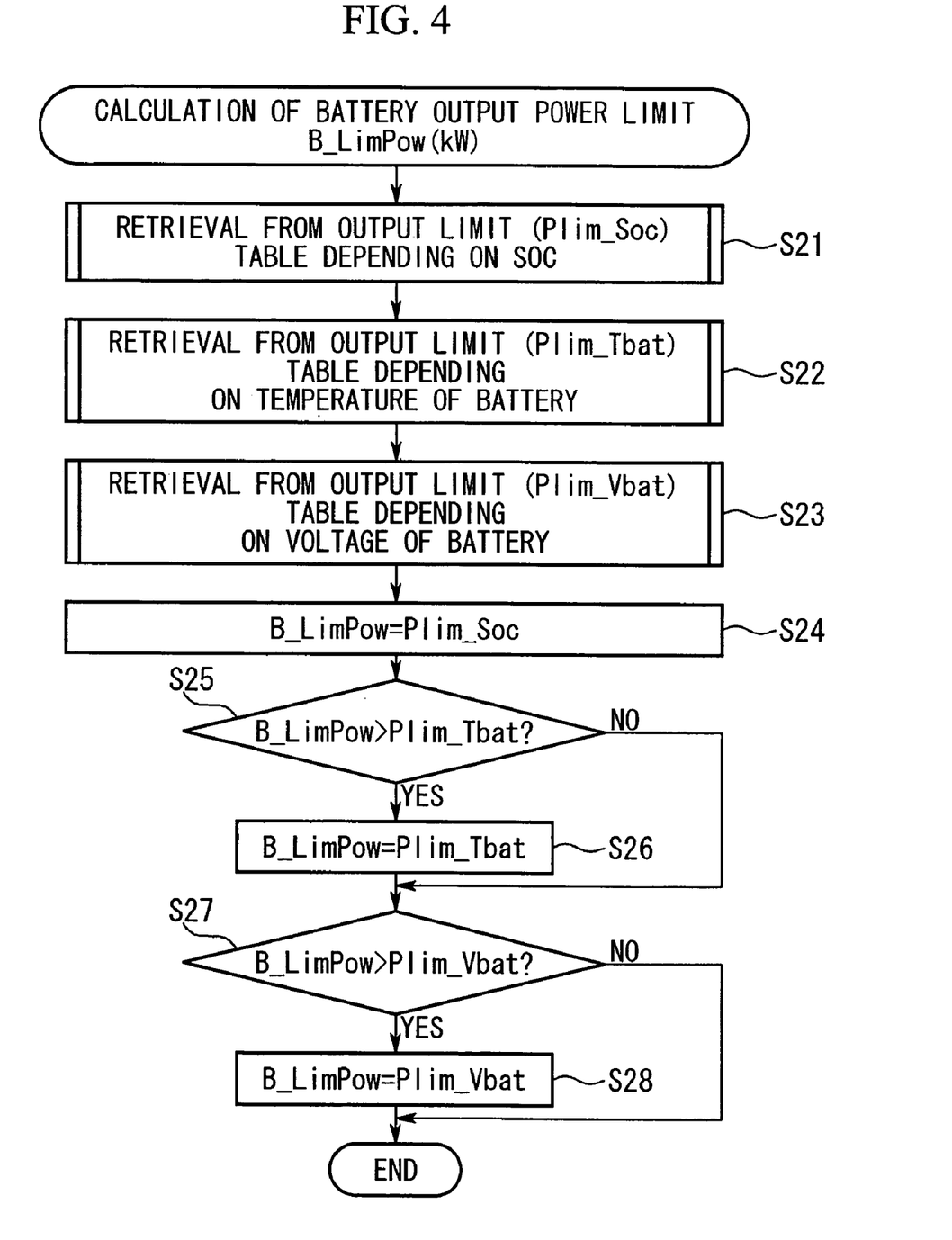
FIG. 4 is a flowchart showing a control operation for calculating a battery output power limit.

The operation for calculating the battery output power limit in step S04, which was mentioned above, will be explained below.

In step S21 shown in FIG. 4, an SOC output limit Plim_Soc is set by referring to an SOC output limit (Plim_Soc) table, which defines output limit depending on the SOC of the main battery 15 (SOC output limit Plim_Soc).

In the SOC output limit (Plim_Soc) table, the SOC output limit Plim_Soc is, for example, set so as to increase up to a predetermined upper limit in accordance with increase in the SOC of the battery.

Next, in step S22, a battery temperature output limit Plim_Tbat is set by referring to a battery temperature output limit (Plim_Tbat) table, which defines output limit depending on the temperature TBAT of the battery (battery temperature output limit Plim_Tbat).

In the battery temperature output limit (Plim_Tbat) table, the battery temperature output limit Plim_Tbat is, for example, set so as to be a predetermined upper limit when the temperature TBAT of the battery is within a predetermined range, so as to increase to the predetermined upper limit in accordance with increase in the temperature TBAT of the battery when the temperature TBAT of the battery is lower than the predetermined range, and so as to decrease from the predetermined upper limit in accordance with increase in the temperature TBAT of the battery when the temperature TBAT of the battery is higher than the predetermined range.

Next, in step S23, a battery voltage output limit Plim_Vbat is set by referring to a battery voltage output limit (Plim_Vbat) table, which defines output limit depending on the voltage VBAT between terminals of the main battery 15.

In the battery voltage output limit (Plim_Vbat) table, the battery voltage output limit Plim_Vbat is, for example, set so as to be a predetermined upper limit when the voltage VBAT of the battery is within a predetermined range, so as to increase to the predetermined upper limit in accordance with increase in the voltage VBAT of the battery when the voltage VBAT of the battery is below the predetermined range, and so as to decrease from the predetermined upper limit in accordance with increase in the voltage VBAT of the battery when the voltage VBAT of the battery is above the predetermined range.

Next, in step S24, the SOC output limit Plim_Soc is set to the battery output power limit B_LimPow which is the electrical power dischargeable from the main battery 15.

In step S25, it is determined whether the battery output power limit B_LimPow is greater than the battery temperature output limit Plim_Tbat.

When the result of the determination is "NO", the operation proceeds to step S27 which will be explained later.

In contrast, when the result of the determination is "YES", the operation proceeds to step S26.

In step S26, the battery temperature output limit Plim_Tbat is set to the battery output power limit B_LimPow.

In step S27, it is determined whether the battery output power limit B_LimPow is greater than the battery voltage output limit Plim_Vbat.

When the result of the determination is "NO", the series of operations is terminated.

In contrast, when the result of the determination is "YES", the operation proceeds to step S28.

In step S28, the battery voltage output limit Plim_Vbat is set to the battery output power limit B_LimPow, and the series of operations is terminated.

In other words, in the above-mentioned steps S21 to S28 in the operation for calculating the battery output power limit, the least value among the SOC output, limit Plim_Soc, the battery temperature output limit Plim_Tbat, and the battery voltage output limit Plim_Vbat is set to the battery output power limit B_LimPow.

Moreover, in steps S01 to S13, the output power limit applied to the powering operation of the rear motor-generator 14 is set so as not to exceed an output power which is obtained by subtracting the front output power F_POWER from the battery output power limit B_LimPow, while on the other hand, at least the accessory output power DV_POWER is ensured by the battery output power limit B_LimPow. As a result, the output power of the rear motor-generator 14 can be sufficiently increased while preferably operating the main battery 15 and the front motor-generator 14.

Figure 5:
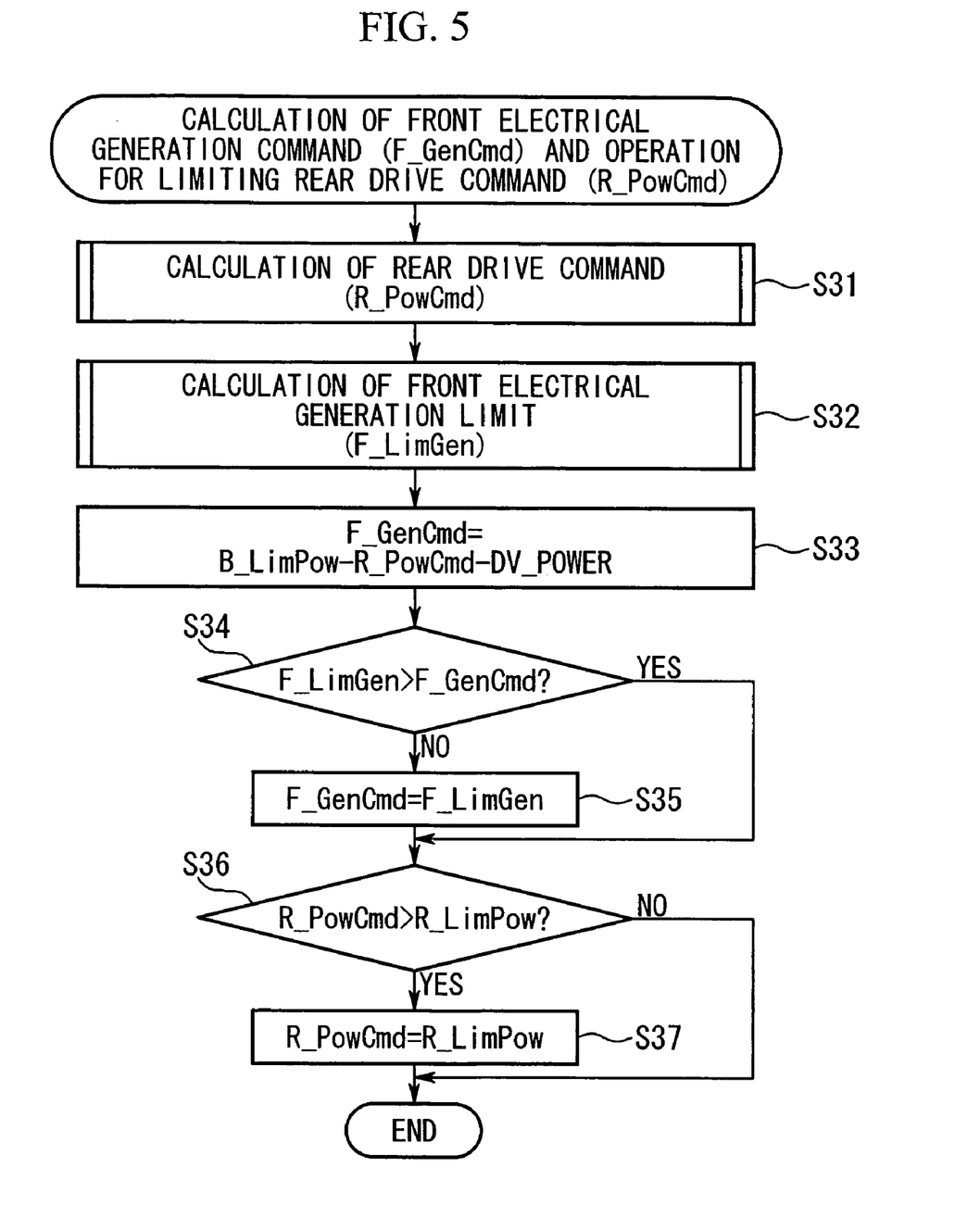
FIG. 5 is a flowchart showing a control operation for limiting an output power command (i.e., a rear drive command R_PowCmd) that is applied to the powering operation of the rear motor-generator.

Next, the operation for limiting an output power command (i.e., a rear drive command R_PowCmd) that is applied to the powering operation of the rear motor-generator 14 will be explained below.

In step S31 shown in FIG. 5, the rear drive command R_PowCmd, which is required for the powering operation of the rear motor-generator 14, is calculated depending on, for example, the running state of the vehicle, etc.

Next, in step S32, the operation for calculating a front electrical generation limit, which will be explained later, is executed so that a front electrical generation limit F_LimGen, which is a limit of electrical power generated by the generating operation of the front motor-generator 12, is calculated.

Next, in step S33, when a calculated value, which is obtained by subtracting the rear drive command R_PowCmd from the battery output power limit B_LimPow, is negative, the absolute value of the calculated value is set as a front electrical generation command F_GenCmd which is required for the generating operation of the front motor-generator 12. In other words, when the battery output power limit B_LimPow is not sufficient for the rear drive command R_PowCmd and the accessory output power DV_POWER, the shortage of the power is supplemented by the generating operation of the front motor-generator 12.

In step S34, it is determined whether the front electrical generation limit F_LimGen is greater than the front electrical generation command F_GenCmd.

When the result of the determination is "YES", the operation proceeds to step S36 which will be explained later.

In contrast, when the result of the determination is "NO", the operation proceeds to step S35.

In step S35, the front electrical generation limit F_LimGen is set to the front electrical generation command F_GenCmd, and the operation proceeds to step S36.

In step S36, it is determined whether the rear drive command R_PowCmd is greater than the rear output power limit R_LimPow.

When the result of the determination is "NO", the series of operations is terminated.

In contrast, when the result of the determination is "YES", the operation proceeds to step S37.

In step S37, the rear output power limit R_LimPow is set to the rear drive command R_PowCmd, and the series of operations is terminated.

Figure 6:
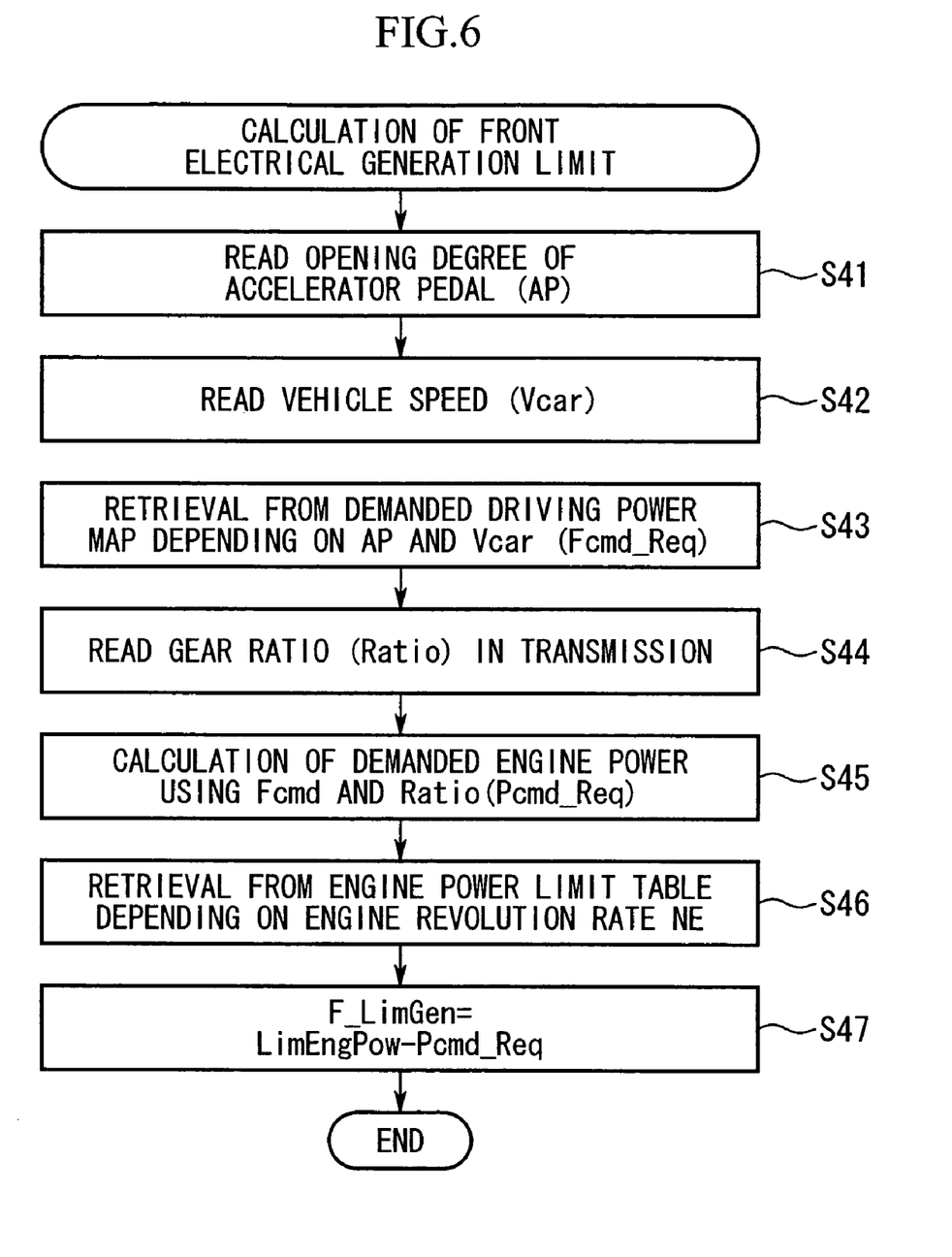
FIG. 6 is a flowchart showing a control operation for calculating a front electrical generation limit.

Next, the operation for calculating a front electrical generation limit in step S32, which was mentioned above, will be explained below.

In step S41 in FIG. 6, an opening degree AP of the accelerator pedal, which relates to an amount of operation of the accelerator pedal by the driver, is measured by, for example, an accelerator pedal opening degree sensor (not shown).

Next, in step S42, the vehicle speed Vcar is measured by, for example, a vehicle speed sensor (not shown).

In step S43, a demanded driving power Fcmd_Req is set by referring to a map (a demanded driving power map) which defines the demanded driving power Fcmd_Req for the front wheels Wf depending on opening degree AP of the accelerator pedal and the vehicle speed Vcar.

Next, step S44, a gear ratio "Ratio" in the transmission is determined.

In step S45, a demanded engine power Pcmd_Req applied to the internal combustion engine 11 is calculated based on the demanded driving power Fcmd_Req and the gear ratio "Ratio".

Next, in step S46, an engine power limit LimEngPow is set by referring to an engine power limit (LimEngPow) table, which defines the engine power limit of the internal combustion engine 11 depending on an engine revolution rate NE of the internal combustion engine 11 (engine power limit LimEngPow) which is measured by a revolution rate sensor (not shown).

In the engine power limit (LimEngPow) table, the engine power limit LimEngPow is, for example, set so as to increase in accordance with increase in the engine revolution rate NE of the internal combustion engine 11.

Next, in step S47, a calculated value, which is obtained by subtracting the demanded engine power Pcmd_Req from the engine power limit LimEngPow, is set as the front electrical generation limit F_LimGen, which is a limit of electrical power generated by the generating operation of the front motor-generator 12, and the series of operations is terminated.

In other words, in the above-mentioned steps S31 to S37, the smaller of the rear drive command R_PowCmd (which is set depending on the running state of the vehicle etc.) and the rear output power limit R_LimPow is set as a new rear drive command R_PowCmd.

According to the present embodiment of the power control device 10 for a hybrid vehicle, the output power of the rear motor-generator 14 can be sufficiently increased without increasing the size of the main battery 15 while preferably operating the main battery 15 and the front motor-generator 14, and while at the same time, the front output power F_POWER and the accessory output power DV_POWER are ensured by the battery output power limit B_LimPow.

In the above embodiment, the rear output power limit R_LimPow is calculated based on the front output power F_POWER; however, the present invention is not limited to this, and, for example, the rear output power limit R_Lim-Pow may be calculated based on an amount of generation in the front F_GEN, which is an amount of generation by the regenerative operation of the front motor-generator 12, and which is calculated based on the output current from the front power drive unit 16.

In this case, in step S13 in the above embodiment, a calculated value, which is obtained by subtracting the accessory output power DV_POWER from a value obtained by adding the amount of generation in the front F_GEN to the battery output power limit B_Lim_Pow, may be set as the rear output power limit R_LimPow.

As a result, the output power of the rear motor-generator 14 can be sufficiently increased without increasing the size of the main battery 15 while preferably operating the main battery 15 and the front motor-generator 14 in contrast to the case in which the rear motor-generator 14 is operated merely depending on the battery output power limit B_Lim_Pow, or merely depending on the amount of generation in the front F_GEN of the front motor-generator 12.

In addition to the above description about the operation for setting the rear drive command R_PowCmd with regard to the above embodiment, the operation for setting a regeneration command which is applied to the rear motor-generator 14 will be explained below. In this case, instead of the battery output power limit B_LimPow, a battery input power limit B_LimPin, which is the electrical power chargeable into the main battery 15, may be calculated based on, for example, the SOC of the battery, the temperature of the battery TBAT, and the voltage VBAT between terminals of the main battery 15 (step T01). Moreover, instead of the front output power F_POWER in the above embodiment, for example, the amount of generation in the front F_GEN, which is the amount of generation by the regenerative operation of the front motor-generator 12, may be calculated based on the output current from the front power drive unit 16 (step T02).

A calculated value, which is obtained by adding the accessory output power DV_POWER to a value obtained by subtracting the amount of generation in the front F_GEN from the battery input power limit B_LimPin, may be set as a regeneration limit which is applied to the regenerating operation of the rear motor-generator 14 (step T03), and the smaller of a regeneration command applied to the regenerating operation of the rear motor-generator 14 (which is set depending on, for example, the running state of the vehicle, etc. (step T04)) and the regeneration limit may be set as a regeneration limit applied to the regenerating operation of the rear motor-generator 14 (step T05).

When the generation command to be applied to the regenerating operation of the rear motor-generator 14 is set, and when the regeneration limit is set based on the front output power F_POWER instead of the amount of generation in the front F_GEN, a calculated value, which is obtained by adding the accessory output power DV_POWER to a value obtained by adding the front output power F_POWER to the battery input power limit B_LimPin, may be set as the regeneration limit which is applied to the regenerating operation of the rear motor-generator 14.

INDUSTRIAL APPLICABILITY

According to the power control apparatus for a hybrid vehicle of the present invention, the output power of the second motor-generator can be greater, without increasing the size of the electrical energy storage device, than in the case in which the second motor-generator is operated merely using the electrical power dischargeable from the electrical energy storage device or the electrical power being generated by the first motor-generator.

Moreover, the second motor-generator can be operated in a powering manner while the electrical energy storage device and the first motor-generator are preferably operated in such a manner that, for example, the electrical energy storage device is prevented from being over-discharged, and the first motor-generator is prevented from receiving an excessive electrical generation command.

According to another power control apparatus for a hybrid vehicle of the present invention, at least the electrical power being discharged from the second electrical energy storage device can be supplemented by the electrical energy storage device, and at the same time, the output power of the second motor-generator can be increased while the electrical energy storage device and the first motor-generator are preferably operated.

According to another power control apparatus for a hybrid vehicle of the present invention, the output power of the second motor-generator and the electrical power being discharged from the second electrical energy storage device can be provided by the electrical power dischargeable from the electrical energy storage device and the electrical power being generated by the first motor-generator.

According to another power control apparatus for a hybrid vehicle of the present invention, when deterioration of the electrical energy storage device is detected, the output power command for the second motor-generator can be ensured by the electrical power being generated by the first motor-generator.

According to another power control apparatus for a hybrid vehicle of the present invention, when deterioration of the electrical energy storage device is detected, the electrical power being discharged from the second electrical energy storage device in addition to the output power command for the second motor-generator can be ensured by the electrical power being generated by the first motor-generator.

According to another power control apparatus for a hybrid vehicle of the present invention, the regenerated energy from the second motor-generator can be greater, without increasing the size of the electrical energy storage device, than in the case in which the second motor-generator is operated in a regeneration manner merely depending on the electrical power chargeable into the electrical energy storage device or depending on the electrical power being supplied to the first motor-generator.

Moreover, the second motor-generator can be operated in a regenerating manner while the electrical energy storage device and the first motor-generator are preferably operated in such a manner that, for example, the electrical energy storage device is prevented from being over-charged, and the first motor-generator is prevented from being supplied with an excessive electrical power.

According to another power control apparatus for a hybrid vehicle of the present invention, the electrical power being discharged from the second electrical energy storage device can be provided by the regenerated energy from the second motor-generator; therefore, the regenerated energy from the second motor-generator can be increased while the electrical energy storage device and the first motor-generator are preferably operated.

The invention claimed is:

1. A power control apparatus for a hybrid vehicle comprising:
an internal combustion engine for driving either the front wheels or the rear wheels;
a first motor-generator which is connected to an output shaft of the internal combustion engine;
a second motor-generator which is connected to the other of the front and rear wheels;
an electrical energy storage device which receives energy from and sends energy to the first and second motor-generators; and
a control unit which is operatively connected to the internal combustion engine, the first and second motor-generator, and the electrical energy storage device, and which includes: an electrical discharge amount calculation section for calculating the electrical power dischargeable from the electrical energy storage device; an electrical power calculation section for calculating the electrical power being generated by the first motor-generator or for calculating the electrical power being supplied to the first motor-generator; an output power command calculation section for calculating an output power command for a powering operation of the second motor-generator; and an output power limiting section which is adapted to calculate the sum of the electrical power dischargeable from the electrical energy storage device and the electrical power being generated by the first motor-generator or the difference between the electrical power dischargeable from the electrical energy storage device and the electrical power being supplied to the first motor-generator, to compare magnitudes of the sum or the difference and of the output power command for the second motor-generator, and to set the smaller of the sum or the difference and the output power command for the second motor-generator as a new output power command for the second motor-generator.

2. A power control apparatus for a hybrid vehicle according to claim 1, further comprising a second electrical energy storage device which is different from the electrical energy storage device, and which is operatively connected to the control unit,
wherein the control unit further includes a second electrical discharge amount calculation section for calculating the electrical power being discharged from the second electrical energy storage device, and
wherein the electrical discharge amount calculation section is adapted to set a calculated value, which is obtained by subtracting the electrical power being discharged from the second electrical energy storage device from the electrical power dischargeable from the electrical energy storage device, as a new electrical power dischargeable from the electrical energy storage device.

3. A power control apparatus for a hybrid vehicle according to claim 1, further comprising a second electrical energy storage device which is different from the electrical energy storage device, and which is operatively connected to the control unit,
wherein the control unit further includes a second electrical discharge amount calculation section for calculating the electrical power being discharged from the second electrical energy storage device, and a generation command calculation section which is adapted to obtain a calculated value by subtracting the output power command for the second motor-generator and the electrical power being discharged from the second electrical energy storage device from the electrical power dischargeable from the electrical energy storage device, and to set the absolute value of the calculated value as a generation command for a generating operation of the first motor-generator when the calculated value is negative.

4. A power control apparatus for a hybrid vehicle according to claim 1, further comprising a deterioration detecting device for determining whether the electrical energy storage device has deteriorated,
wherein the control unit further includes an output power command setting section for setting the output power command for the second motor-generator in such a manner that, when the electrical power calculation section is calculating the electrical power being generated by the first motor-generator, and when deterioration of the electrical energy storage device is detected by the deterioration detecting device, the electrical power being generated by the first motor-generator which is calculated by the electrical power calculation section is set as the output power command for the second motor-generator.

5. A power control apparatus for a hybrid vehicle according to claim 4, further comprising a second electrical energy storage device which is different from the electrical energy storage device, and which is operatively connected to the control unit, wherein the control unit further includes a second electrical discharge amount calculation section for calculating the electrical power being discharged from the second electrical energy storage device, and wherein the output power command setting section is adapted to set a calculated value, which is obtained by subtracting the electrical power being discharged from the second electrical energy storage device from the electrical power being generated by the first motor-generator which is calculated by the electrical power calculation section, as the output power command for the second motor-generator.

6. A power control apparatus for a hybrid vehicle comprising:

an internal combustion engine for driving either the front wheels or the rear wheels;

a first motor-generator which is connected to an output shaft of the internal combustion engine;

a second motor-generator which is connected to the other of the front and rear wheels;

an electrical energy storage device which receives energy from and sends energy to the first and second motor-generators; and a control unit which is operatively connected to the internal combustion engine, the first and second motor-generator, and the electrical energy storage device, and which includes: an electrical charge amount calculation section for calculating the electrical power chargeable into the electrical energy storage device; an electrical power calculation section for calculating the electrical power being generated by the first motor-generator or for calculating the electrical power being supplied to the first motor-generator; a regeneration command calculation section for calculating a regeneration command for a regenerating operation of the second motor-generator; and a regeneration limiting section which is adapted to calculate the sum of the electrical power chargeable into the electrical energy storage device and the electrical power being supplied to the first motor-generator or the difference between the electrical power chargeable into the electrical energy storage device and the electrical power being generated by the first motor-generator, to compare magnitudes of the sum or the difference and of the regeneration command for the second motor-generator, and to set the smaller of the sum or the difference and the regeneration command for the second motor-generator as a new regeneration command for the second motor-generator.

7. A power control apparatus for a hybrid vehicle according to claim 6, further comprising a second electrical energy storage device which is different from the electrical energy storage device, and which is operatively connected to the control unit, wherein the control unit further includes a second electrical discharge amount calculation section for calculating the electrical power being discharged from the second electrical energy storage device, and wherein the electrical charge amount calculation section is adapted to set a calculated value, which is obtained by adding the electrical power being discharged from the second electrical energy storage device to the electrical power chargeable into the electrical energy storage device, as a new electrical power dischargeable from the electrical energy storage device.

* * * * *